United States Patent [19]
Croft

[11] 3,789,592
[45] Feb. 5, 1974

[54] PECAN HARVESTING MACHINE
[75] Inventor: W. Jack Croft, Wichita Falls, Tex.
[73] Assignee: Wichita Engineering Co., Inc., Wichita Falls, Tex.
[22] Filed: Oct. 12, 1971
[21] Appl. No.: 188,188

[52] U.S. Cl. .............................................. 56/328 R
[51] Int. Cl. ............................................ A01g 19/00
[58] Field of Search....... 56/328 R, 12.8, 12.9, 13.1, 56/13.2, 13.3, 13.4, DIG. 8; 130/26

[56] References Cited
UNITED STATES PATENTS

| | | | |
|---|---|---|---|
| 2,928,225 | 3/1960 | Spencer | 56/328 R |
| 3,193,995 | 7/1965 | Miller | 56/12.9 |
| 3,387,442 | 6/1968 | Henson | 56/328 R |
| 3,646,373 | 2/1972 | Hayes | 130/26 |
| 2,780,904 | 2/1957 | Bowie et al. | 56/328 R |
| 3,597,905 | 8/1971 | Jarrell | 56/12.8 |

Primary Examiner—Antonio F. Guida
Attorney, Agent, or Firm—Marcus L. Bates

[57] ABSTRACT

A self propelled harvesting machine for picking up nuts along with debris from the surface of the ground and separating the nuts from the debris so as to enable one person to mechanically harvest an entire crop of nuts such as pecans. The machine has a special pickup device which utilizes spaced apart sweepers which mechanically urges material to travel through a floating head with the aid of a current of air. This action transfers the nuts into a separator where the nuts and debris are separated from one another by utilization of both air and mechanical separation means. A squirrel cage type separator finally removes the remaining debris from the nuts.

7 Claims, 18 Drawing Figures

PATENTED FEB 5 1974

PECAN HARVESTING MACHINE

BACKGROUND OF THE INVENTION

The greatest obstacle to a successful harvest that a pecan farmer must overcome from year to year is the gathering of his crop. Often a valuable pecan crop will be reaching final maturity when adverse weather conditions create rain storms and strong winds that either knock or blow the pecans from the trees. As the pecans fall they are admixed with the usual ground debris including tree leaves, grass, animal refuse, litter such as paper and cans, as well as an abundance of foreign material having a weight and size similar to that of the average pecan. When this occurs, especially if the rainy conditions linger, it is absolutely essential that the farmer gather his crop immediately, otherwise, it will rapidly deteriorate and become valueless. Even under the most favorable conditions during the pecan harvesting season, it is sometime difficult to rally a sufficient number of laborers to manually gather the crop.

Many mechanical nut pickers for harvesting pecans have been proposed by the prior art, as for example, the patent to Henson, U.S. Pat. No. 3,387,442 and Ramacher, U.S. Pat. No. 2,854,808, to which reference is made for further background of this invention.

These and other mechanical harvesting machines of the prior art have enjoyed limited success, however, there are other machines which have caused this field of endeavor to fall into ill repute because they often damage the fruit, fail to completely separate debris from the nuts, or leave excessive crops laying on the ground. Some machines are so large they cannot be driven closely adjacent to the trees, runover and crush the nuts, and sometime damage the low hanging branches in the orchard. Other machines are too slow and require excessive horsepower, or, are complex and difficult to maintain; while still other machines must be pulled by a tractor.

The present invention overcomes the above objections by the provision of a low profile lightweight and simply fabricated nut harvesting machine which picks up nuts along with debris, and efficiently separates the nuts from the unwanted material so that the remaining fruit can be delivered directly to the wholesaler for final processing and grading.

While the present machine is often referred to herein as apparatus for picking up pecans, it will be understood that the apparatus can be utilized to separate other nuts and nut-like objects from debris-like material.

SUMMARY OF THE INVENTION

This invention comprehends a harvesting machine for picking up nuts along with some of the debris laying on the ground, comprising a self propelled vehicle adapted to move along the ground and having a pick-up means in the form of a floating head attached thereto and movable into close proximity to the surface of the ground. The pick-up means has an inlet, an outlet, and spaced apart coacting sweepers which mechanically contact the material to be picked up off the ground, while simultaneously inducing an air flow which forces the material to move through the outlet.

The nuts and debris flow from the pick-up means into a separator means which is in the form of a housing, and includes a straw-walker which divides the housing into an upper and a lower chamber.

The upper chamber is open-ended to the atmosphere to enable lightweight debris to flow outwardly thereof on a column of air, while the intermediate weight material is "walked" through the open end because of the action of the straw-walker. Nuts, along with similar size and weight material, flow through the straw-walker and are urged to move along the floor of the lower chamber where a screw conveyor transfers the material into an elevator. The elevator lifts the material into a squirrel cage type separator, where the debris free nuts then flow into a container which holds the product in readiness to be cleaned, treated, graded, and marketed.

A primary object of this invention is the provision of a harvesting machine for picking up nuts laying on the ground.

Another object of the invention is to provide a harvesting machine adapted to pick up pecans along with debris laying on the ground, separate the pecans from the debris, and finally deposit the clean pecans in a convenient container.

A further object of this invention is to disclose and provide a harvesting machine for picking up nuts which includes a pick-up means comprised of spaced apart sweepers which force the nuts to travel to a separator means.

A still further object of this invention is to provide a harvesting machine for picking up nuts laying on the ground which includes spaced apart coacting sweepers which mechanically force the nuts off the ground into a column of air produced by the sweepers and thence to a separator means.

Another and still further object of the present invention is the provision of a new combination of elements having improvements therein for mechanically harvesting nuts laying on the ground.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 3 is an enlarged, detailed, side elevational view of the machine seen in FIGS. 1 and 2, with some parts thereof being broken away to show the interior thereof, and some of the remaining parts being shown in section;

FIG. 4A is a fragmentary end view of the machine seen in FIG. 3, while FIG. 4b is an enlarged detail of part of the apparatus seen in FIGS. 3 and 5;

FIG. 16 is an enlarged cross-sectional view taken along line 16—16 of FIG. 17; while

DETAILED DESCRIPTION OF THE PREFERRED EMBODIMENTS

Figure 1:
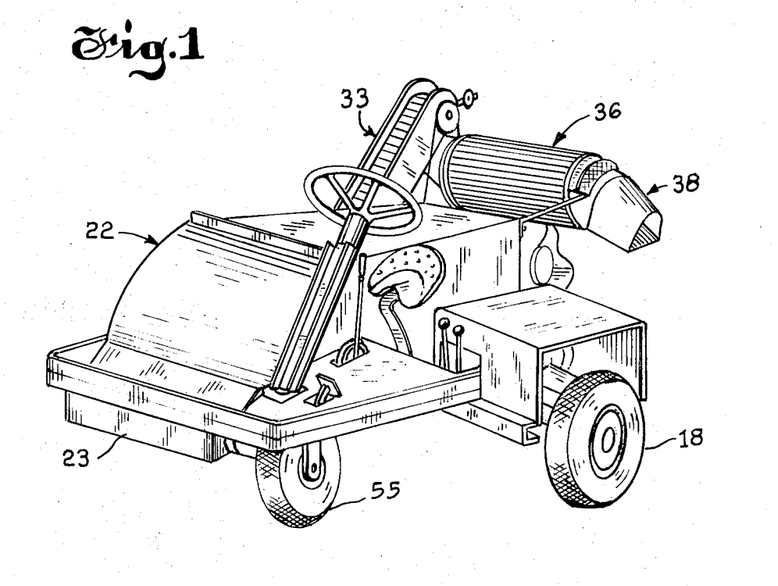
FIG. 1 is a perspective view which discloses one embodiment of a harvesting machine for picking up nuts laying on the ground, which has been fabricated in accordance with the present invention.
Figure 2:
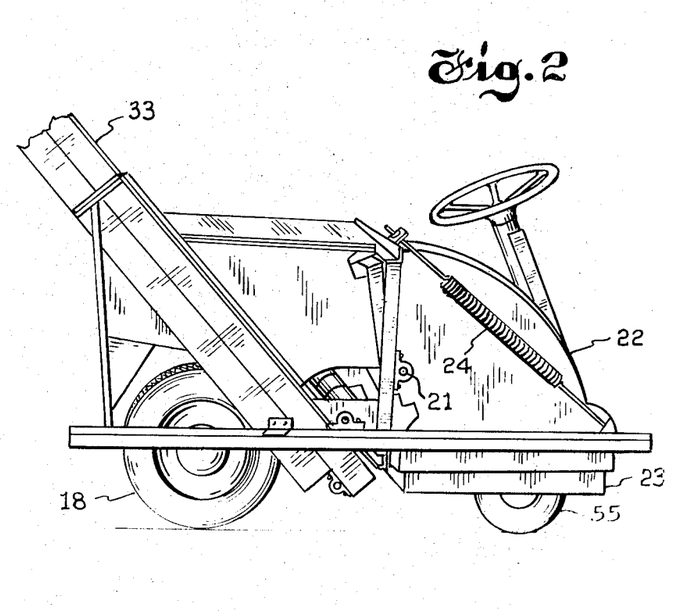
FIG. 2 is a side view of the machine seen in FIG. 1.
Figures 3, 4A, 4B:
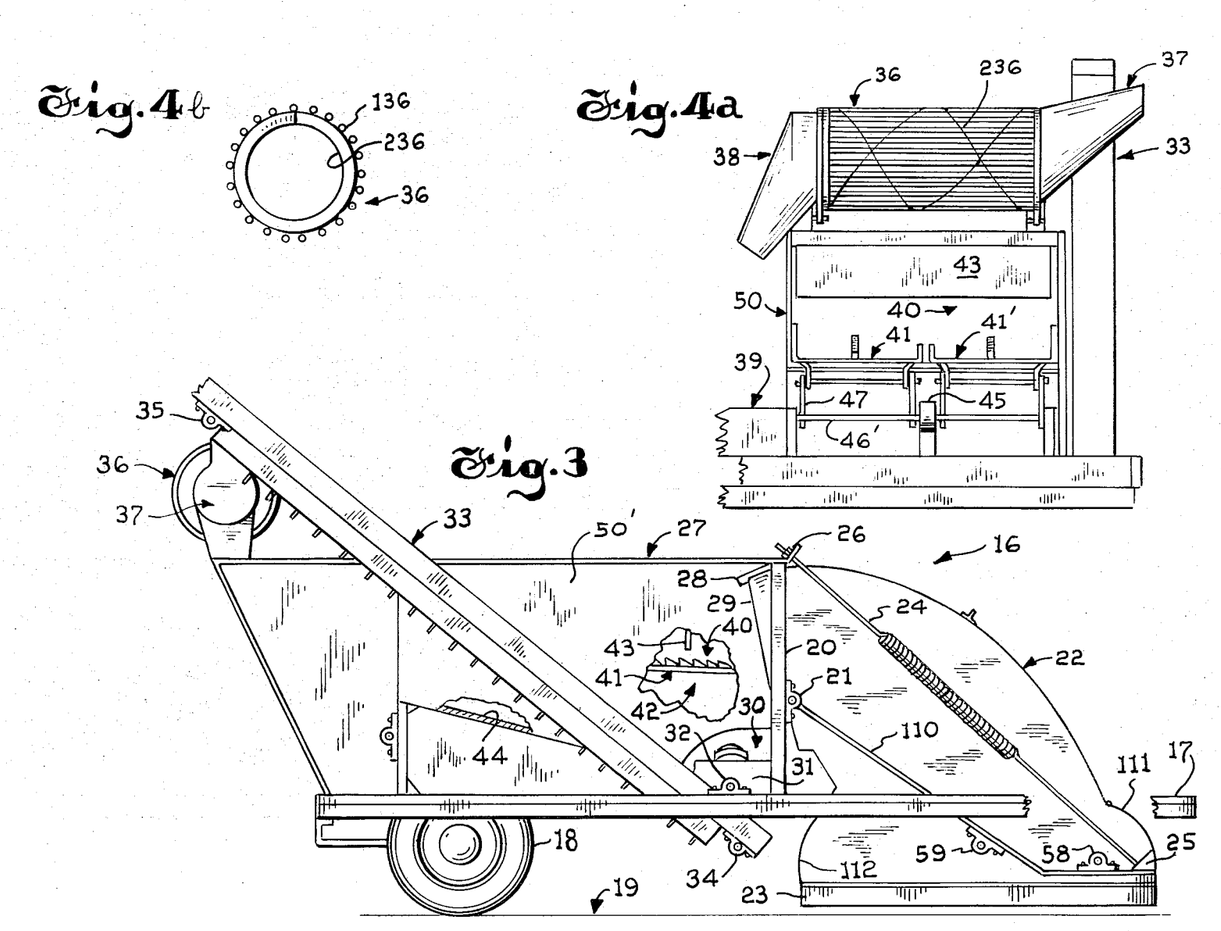

FIGS. 1 and 2 disclose a low profile harvesting machine made in accordance with the present invention. In FIG. 3 the nut harvester is generally indicated by the arrow at numeral 16, and in this particular embodiment the machine is seen to include a main frame member 17 which extends about the entire periphery of the apparatus. Three point suspension of the frame is effected by pneumatic tires, one of which is seen at 18, with each of the tires bearing against the surface 19 of the ground in the usual manner.

A forward vertical frame member 20 upwardly depends from the main frame and supports a journal means 21 which is in the form of a pillow-block bearing for pivotally supporting a pick-up means 22 which is in the form of a floating head. A skirt 23 underlays the head and forms an inlet to the pick-up means. The skirt preferably is in the form of a flexible or resilient member which can conform to irregular objects placed in its path.

A counterbalance 24 includes the illustrated spaced apart rods with a biasing means being interposed therein, which for purposes of illustration is shown to be in the form of a heavy duty spring with the depending free ends of the rods being adjustably attached to gussets at 25 and 26.

Rearwardly disposed of the head 22 is a means for separating nuts from debris, which includes a housing which is provided with an arcuate slot at 28 for receiving the uppermost rearwardly disposed edge portion of the head therein. Vertical edge portion 29 of the head encloses a limited area of the housing 27 and preferably is provided with a resilient seal means therebetween.

Lateral screw conveyor 30 can take on any number of known forms, and is seen to be disposed in underlaying relationship with respect to the separator means 27. End wall 31 of the screw conveyor receives the screw shaft therethrough with the shaft being journaled to the main frame by means of the pillow-block bearing 32 which is supported by the main frame.

An elevator 33, which can take on any number of known forms, and for purposes of illustration is seen to be laying at approximately 45° relative to the main frame. Pillow-block bearings 34 and 35 supportingly and movingly receive the belt conveyor therebetween. A squirrel cage type separator 36, the details of which will be better illustrated later on in this disclosure, is operatively connected to the uppermost end of the elevator by means of a chute 37 so that nuts elevated into overlying position relative thereto can flow from the elevator into the separator.

Outlet chute 38 discharges into a container which can be positioned in the area generally illustrated by the arrow at numeral 39.

As seen in FIGS. 3–7 and 11, the separator means includes an open ended upper chamber 40, a pair of adjacently arranged but oppositely reciprocating straw-walkers 41, and a lower chamber 42; hence the separator housing 27 is separated into an upper and a lower chamber by means of the straw-walkers. Moreover, while two straw-walkers are illustrated herein, it is considered within the comprehension of this invention to provide a single straw-walker within the illustrated chamber.

Figure 11:
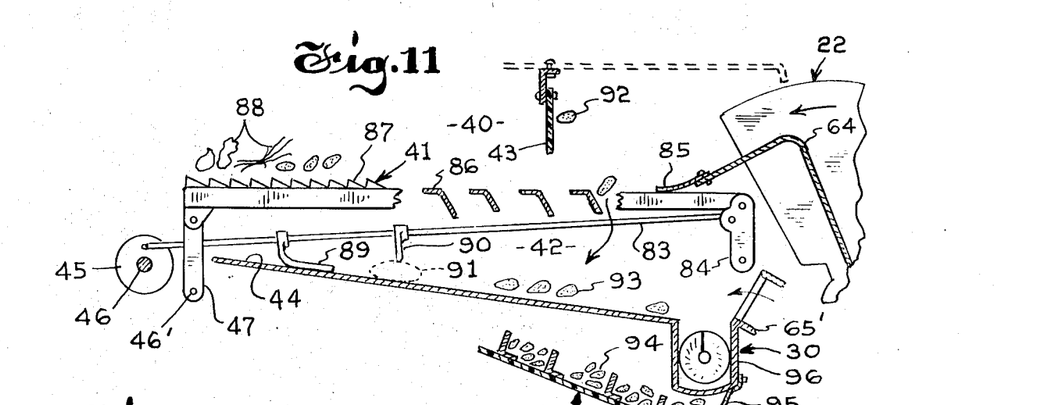
FIG. 11 is a fragmentary, broken, part cross-sectional view taken longitudinally along the central portion of an apparatus such as seen disclosed in FIG. 3.
Figure 12:
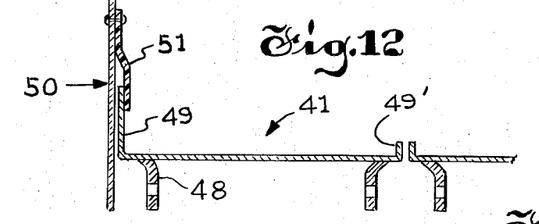
FIG. 12 is a fragmentary, cross-sectional view taken along line 12—12 of FIG. 6.

A resilient dangling bulkhead 43 is attached to the roof of the separator and vertically depends in a downward direction into overhanging relationship with respect to, but clear of, the upper surface of the straw-walkers when the straw-walkers are at their uppermost extremity of travel. A sloped floor 44 forms the lower wall surface of the separator.

Eccentric 45 is affixed to a shaft 46 which is rotated by any convenient gear train with the gear train preferably being connected to a prime mover associated with the vehicle. Oscillating links 47 are freely journaled to fixed horizontal rod 46'. Legs 48 are journaled to the links and affixed to the undersurface of the straw-walkers. Vertical edge portions 49, 49' are spaced apart from one another with adjacent edge portions 49' being slightly spaced apart from one another and with the longer edge portion 49 being slightly spaced apart from the inside surface of the vertical bulkhead 50 of the separator housing. A longitudinally extending seal flap 51 is riveted to the vertical bulkhead and loosely encloses the longitudinally extending vertical side of the straw-walker so as to prevent material from lodging between the bulkhead and the walker side.

Figure 5:
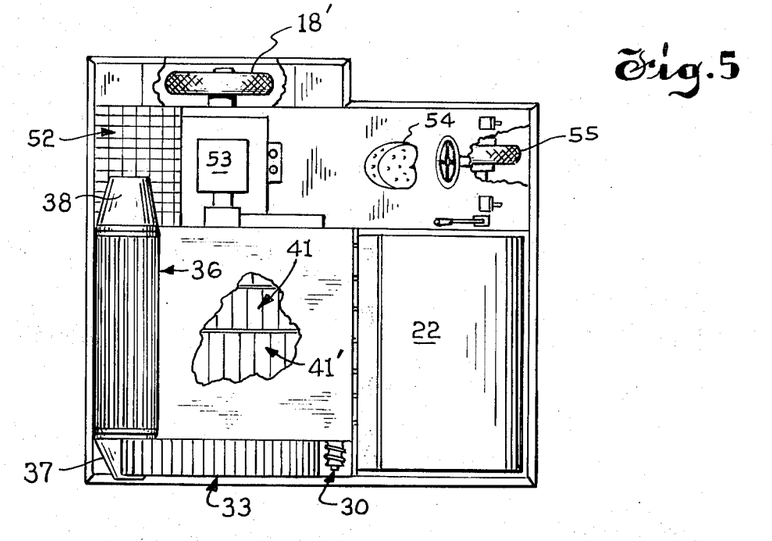
FIG. 5 is a top plan view of the machine disclosed in FIG. 3.
Figure 6:
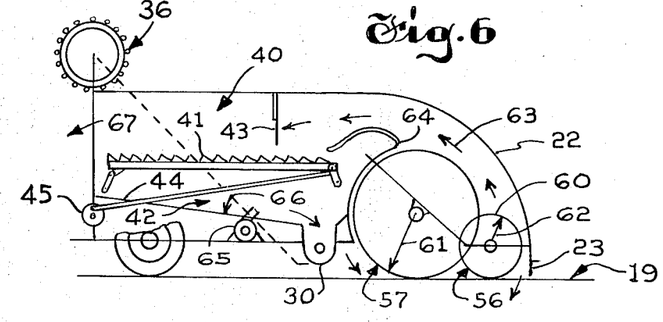
FIG. 6 is a schematical representation which sets forth several important teachings of the present invention.
Figure 7:
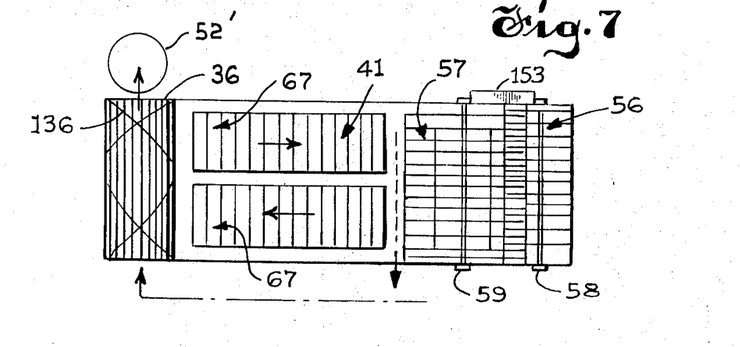
FIG. 7 is a top plan view similar to FIG. 6.

In FIG. 5 a support grid 52 underlies the outlet chute of the squirrel cage tumbling separator, while a prime mover is conveniently positioned in the general area indicated by numeral 53. The prime mover preferably is an internal combustion engine and includes a conventional power take-off means for selectively engaging and driving the rear wheels, the pick-up means, and the separator means.

Seat 54 is positioned on the illustrated platform in spaced apart relationship with respect to a conventional steering wheel which is connected to a single front pneumatic tired wheel 51. In order that the front wheel can be rotated in either direction, the axel thereof lies 90° to the axel which supports the drive wheels 18, 18'.

Looking again to the details of the pick-up means, and in particular to FIGS. 3 and 6–10, a forward sweeper 56 is axially spaced apart from a rear sweeper 57 with each of the sweepers having a laterally arranged axel or shaft means journaled to the floating head at 58, 59 by suitable journal means such as the illustrated pillow block bearing, for example. Each sweeper is connected to a gear train 153 so as to maintain the tubular members and the vanes meshed together in indexed relationship. It will be noted that the sweepers over-lap one another in the manner indicated by numeral 60. The rearward sweeper has an effective major diameter indicated by numeral 61 while the major diameter of the forward sweeper is indicated by the arrow at numeral 62.

Figures 8, 10:
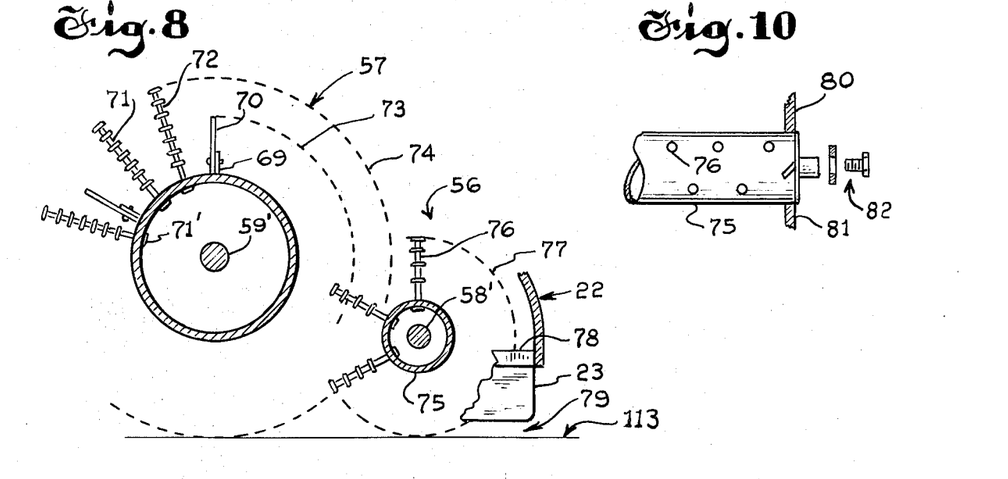
FIG. 8 is an incomplete partial longitudinal cross-sectional view of the sweeper apparatus taken along the forward end of the machine of FIG. 3, as for example, along line 8—8 of FIG. 14, which sets forth details of construction of some of the sweeper mechanism located in the forward end of the machine.
FIGS. 9 and 10, respectively, are fragmentary representations of part of the sweeper apparatus seen in FIG. 8, with some of the parts thereof being removed therefrom.
Figure 9:
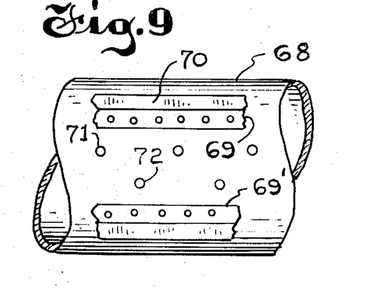

The cooperative action of the rotating intermeshed sweepers produces an air flow which proceeds up through the tunnel portion of the head in the manner illustrated by the arrow at numeral 63.

A fixed nose 64 laterally extends across the head and is affixed to the spaced apart vertical side walls thereof so as to add rigidity to the entire assembly and to provide a semi-monocoque structure. The contour of the nose 64 aerodynamically controls and directs the air flow produced by the sweepers so as to cause material picked up off the ground by the sweepers to preferentially flow along the indicated flow path 63.

Numeral 66 indicates the flow path of material which passes through the apertured straw-walker. The open ended outlet 67 of the upper chamber underlies the squirrel cage separator and allows airborn material to exit to the atmosphere, while carrying material falling from the squirrel cage therewith.

Looking more particularly now to the details presented by FIGS. 8–10, the rearward sweeper is seen to include a lateral drum 68 having radially spaced apart longitudinally disposed plate members 69 affixed to the outer peripheral surface of the drum so as to enable the resilient vanes 70 to be removably attached thereto by the illustrated fastener means. Disposed between adjacent vanes and radially depending from the drum are twin rows of tubular members 71, 72 arranged in staggered relationship relative to one another. The elongated resilient tubular members are made of rubber-like material, and include the illustrated spaced ribs molded thereon. The members are commercially available and well known in the poultry art, and are referred to as "turkey picking elements". Other resilient tubular members could be substituted for the turkey picking elements. The ribed tubular members are extended past the effective diameter 73 of the vanes to form the before mentioned effective overall diameter 74.

The forward lateral drum 75 is affixed to the lateral shaft 58' by any suitable means and includes resilient tubular-like chicken pickers 76 radially placed about the drum to form an effective overall diameter 77. The tubular elements are disposed in twin rows with the element of one row being staggered with respect to the element of another row.

Shafts 58', 59' are indexed together by any suitable gear train so that they each rotate the same number of degrees relative to one another. The vanes 70 and the tubular members 71, 72 of the rearward sweeper is meshed with respect to the tubular members 76 of the forward drum so as to prevent the apparatus of one sweeper from unduly wearing against the apparatus of the remaining sweeper, while at the same time this indexed or intermeshed coaction of the two spaced apart sweepers cause an air flow to be produced much like the action of a gear train or vane type blower.

The skirt preferably is positioned slightly above ground level 113, thereby leaving a narrow spaced at 79. Shafts 58', 59', are disposed relative to support 78 so as to cause diameter 74 and 77 to simultaneously contact the ground 113, so that when the lower most edge portion of the skirt contacts the ground, approximately one and one-half inches of the free end portion of members 71 and 76 are in contact with ground level. The term "ground level" would, of course, relate to the effective or average surface area formed by nuts and debris.

Spaced apart impellers 80, which are twisted in a direction to cause air flow towards one another, are located at the diametrically opposed marginal end portions of the forward sweeper in the illustrated manner of FIG. 10. Any suitable fastener means 82 can be utilized to affix the shaft 58' to the journal means.

Looking again to the details of FIG. 11, in conjunction with a number of the remaining figures, a reciprocating tubular member 83 is journaled to a driven link 84, with the driven link being journaled to the forward end of the straw-walker and the lower end of the link being journaled to structure of the separator. A seal 85 includes a laterally extending edge portion which slidably contacts an upper surface of the walker, with the remaining laterally extending edge portion of the seal being attached to a rearward edge portion of the nose 64 so as to prevent leakage of air and therefore maintain the before mentioned path of air flow.

Spaced apart members 86 form laterally arranged louvers in the straw-walker so as to enable nuts to flow therebetween. This portion of the straw-walker can be stamped by conventional means from a single plate of steel, if desired. A single serrated member 87 is riveted to the lattices 86 to add rigidity to the straw-walker and to provide a means by which debris 88 is "walked" towards the open end of the upper chamber.

A pusher 89 laterally extends across the effective width of the straw-walker and is continually reciprocated to cause debris that may otherwise accumulate on floor 44 to be pushed with the direction of travel of the debris being towards wiper 90. The wiper 90 is of the same width as the pusher and vertically depends toward floor 44 so that the induced motion illustrated at 91 causes material at 93 to be moved with a sweeping motion toward the screw conveyor.

Pecans 92, 93, and 94 are shown at various locations during their travel through the machine. A dam 95 is attached to structure 96 of the screw conveyor and depends into overlapping relationship with one of the vertical bulkheads 97 of the elevator so as to cause the orderly movement of material from the screw conveyor into the elevator.

Figure 13:
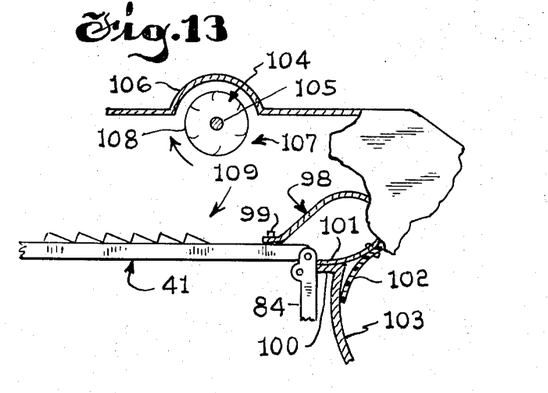
FIG. 13 is similar to FIG. 11 and sets forth a modification of the invention.
Figure 14:
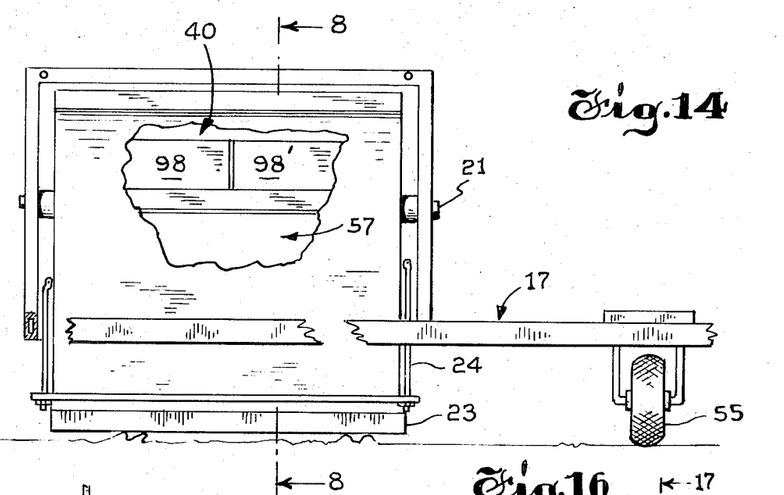
FIG. 14 is a front end view of a modification of the apparatus disclosed in FIG. 3.
Figures 15, 17:
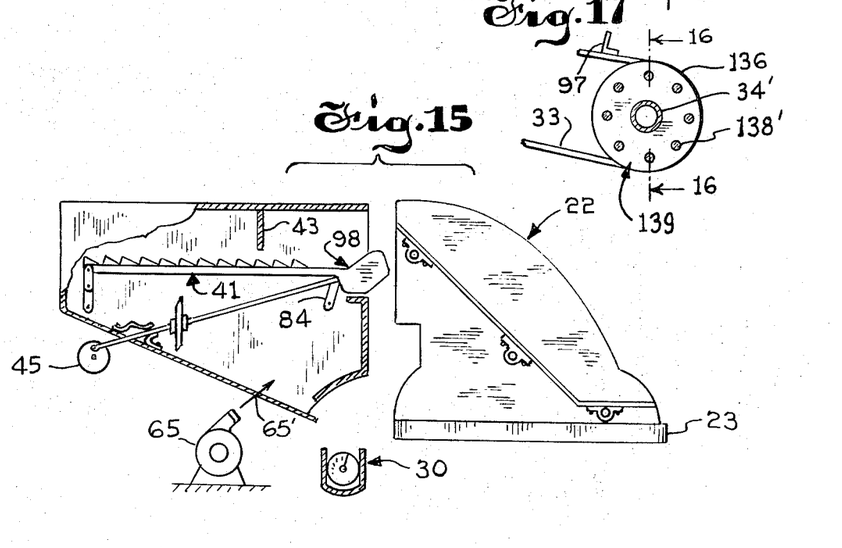
FIG. 15 is a part cross-sectional view of a modification which can be used in conjunction with the apparatus seen disclosed in FIG. 3.
FIG. 17 is a reduced cross sectional view.

In FIGS. 13–15, the nose 98 is attached to the walker by any suitable fastener means 99 so that the laterally extending nose moves with the walker. A ledger plate 100 sealingly cooperates with lower surface 101 of the nose so as to prevent air from flowing therethrough. Resilient seal means 102 is attached to the nose and sealingly extends into contact with rearward structure 103 of the floating head assembly.

A rotating drum 104 includes a laterally disposed shaft 105 attached thereto and journaled to opposed vertical walls of the separator. The drum is rotated in the illustrated direction of the arrow at 106. Vanes arranged inwardly of the drum produces an axial air flow which emerges through perforations in surface 108 of the drum. Resilient material can be affixed to the outer peripheral surface of the drum, if desired, so as to minimize damage to the nuts impinging thereon.

As material enters the separator at 107, it impinges upon the drum surface 108 whereupon it is moved in the direction of the arrow indicated by numeral 109.

In operation, the internal combustion engine of the harvesting machine is operatively engaged so as to drive the wheels 18, 18' while the third wheel 55 determines the path of travel of the vehicle. The vehicle travels in a forward direction, that is towards the pick-up means, with the pick-up means being positioned closely adjacent to the ground so that the sweepers actually contact the ground surface with approximately one to two inches of the free end of the resilient tubular members of the sweepers being extended into contact with the surface of the ground. This action causes the tubular members to contact material laying on the ground, throwing it in an inclined upward direction and towards the rear drum where the material is caught between adjacent vanes. Any material returning to the ground or inadvertently missed by the front sweeper will be picked up and thrown back towards the forward sweeper where it is again cycled by the pick-up means. The material caught between the vanes is thrown into the air stream produced by the action of the counter-rotating sweepers, with the material continuing to move along the tunnel provided by the nose and the upper wall surface of the floating head.

The nuts, along with the debris, strike the dangling baffle and fall onto the walkers, with the lighter material continuing to be airborne through the open end of the upper chamber of the separator.

As the walker is driven in an elliptical orbit, the debris 88 is continuously thrown upward and rearwardly of the walker until it is actually walked off of the end of the walker. At the same time, the blower produces an air flow which can be traced from the lower chamber and through the apertures formed in the walker so as to remove lightweight material from the walker, with the removed material joining the airflow from the pick-up means and exiting through the open ended chamber. Any final debris from the squirrel tumbler will fall into the path of and be blown outwardly away from the machine by this air flow.

During inclement weather pecans and material of similar size and density fall through the walker onto the floor 44, where the wet material adheres to the floor, and accordingly, the pusher 89 and the flap 90 continuously move the material at 93 towards the screw conveyor. The material is next moved laterally toward the right hand side of the machine where the conveyers dump the nuts into the elevator, with the nuts flowing down the dam 95 and into the traveling upwardly opening box-like members 94 of the elevator.

The material continues to travel into overhanging relationship with respect to the squirrel cage separator or tumbler whereupon the material is dropped through chute 37, in a conventional manner, into the tumbler.

Final removal of debris is effected by the radially spaced apart bars of the tumbler. The illustrated opposed spiral vanes of the tumbler move the material towards outlet chute 38. The material falls into the outlet chute and into a suitable container located at 39.

Accordingly, the present invention provides apparatus 16 for harvesting nuts and the like, including pecans, which is in the form of a self propelled vehicle adapted to move along the ground and having a pick-up means 22 in the form of a floating head, with the floating head being adjustable relative to the ground level 19 and to the frame 17. The floating head has a pair of spaced apart sweepers 56, 57 that are journaled at 58, 59 to the head. The two sweepers rotate in opposed directions relative to each other so as to produce an air flow through the head. The head, together with the nose 64 forms a tunnel through which nuts and debris flow into a separator 27. The separator includes a walker 41 located therein which divides the enclosure into an upper chamber 40 and a lower chamber 42, with the upper chamber being open ended at 67 to the atmosphere. A squirrel cage type tumbler 36 forms a final separation means and overlies the open-ended chamber so that air flow at 67 carries debris from the tumbler and the separator outwardly from the machine. A blower 65 provides air flow up through the walker so as to remove unwanted material therefrom. As seen in FIG. 14, the lower chamber is provided with an inlet 65' through which air flows from the blower 65 (not shown). Material is moved from the lower chamber to the tumbler by means of a screw conveyor 30 in conjunction with the elevator 33.

The low profile harvesting machine avoids damage to overhanging branches in the orchard, can be driven into contact with the trees without injury to the trees or the vehicle because of the peripherally extending main frame member. The three point suspension simplifies the operation where the ground is not level.

Figure 16:
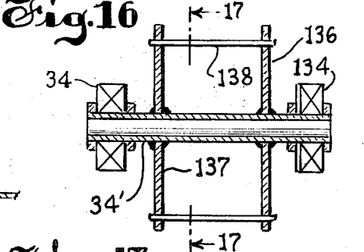

In FIGS. 16 and 17, the idler roller to the belt 33 of the elevator is disposed in underlying relationship with respect to the frame and the screw conveyor. This location prevents a condition wherein the interface between the belt and a prior art roller will soon accumulate dirt or other foreign matter thereon, leading to early malfunction of the lower idler roller assembly.

To prevent this malfunction, the lower idler roller is made into the novel squirrel cage assembly seen illustrated in the drawings. The shaft 34' is journaled to the spaced apart pillot block bearings 34, 134, with the spaced apart end plates 136, 137 being welded to the shaft 34'. Radially spaced apart apertures 138' receive the transverse bars 138 therethrough, with the end portions of the bar being welded or bolted to the end plates. The bars may be located on a circle having a diameter slightly smaller than the major diameter of the end plates, should it be desired to provide a flange at 139 for capturing the flat belt therebetween.

Dirt and other debris cannot collect on the squirrel cage assembly because it is forced inwardly thereof, between the bars, where centrifugal action soon disposes of it. Alternatively the end plates may be apertured inwardly of the bar circle to provide an outlet for accumulated debris.

I claim:

1. A harvesting machine for crops such as nuts laying on the ground comprising a ground supported vehicle, means by which said vehicle can be moved along the ground, a pick-up means and a separator means mounted on said machine for picking up the crops and separating the nuts from debris;

said pick-up means includes a head made into the form of a housing, a pair of spaced apart sweepers, said head having an inlet and an outlet spaced apart from one another by said sweepers, means by which said sweepers are journaled within said head; means for imparting rotational motion into each sweeper, with one sweeper rotating in an opposite direction relative to the other sweeper;

said sweepers being arranged fore and aft of each other with each said sweeper having a plurality of elongated tubular resilient members radially disposed thereabout; one said sweeper being circular in cross-section and having vanes radially disposed thereabout and parallel to the central longitudinal axis thereof;

each of said sweepers having one end of said tubular resilient members connected thereto, the free depending marginal ends of said tubular resilient members of one said sweeper being received between adjacent vanes of another of said sweepers when the sweepers are rotated;

means including said vanes on one said sweeper for producing an air flow from said inlet to said outlet so that when the sweepers are in close proximity to the ground, nuts and debris are forced into the inlet, through the sweepers, and through the outlet and to said separator means;

said separator means including a housing, means forming a straw-walker apparatus in said housing, said straw-walker having means forming openings therein through which nuts can travel, said straw-walker dividing said separator housing into an upper and a lower chamber; said upper chamber having an air inlet and a debris outlet;

means for moving said nuts from said outlet of said head, through said air inlet of said separator, into said upper chamber, and onto said straw-walker; whereby:

nuts fall from said upper chamber onto and through said straw-walker and into said lower chamber while debris is forced through said debris outlet of said separator.

2. The harvesting machine of claim 1 wherein each sweeper is connected to a gear train so as to maintain the tubular members and the vanes meshed together in indexed relationship.

3. The harvesting machine of claim 1 wherein said pick-up means includes a floating head assembly, said inlet to said pick-up means being disposed in underlying relationship with respect to said sweepers, means for moving said head so that said inlet moves vertically with respect to the vehicle to thereby enable said inlet to be vertically positioned relative to the ground;

means mounting said straw-walker in said housing so that one end of said straw-walker reciprocates longitudinally of its length while an opposed end is moved in an elliptical orbit;

a blower means connected to said lower chamber for flowing air through said straw-walker and through said debris outlet;

an outlet in said lower chamber through which nuts can pass; whereby:

nuts and debris are picked up off the ground by the pick-up means and transferred into the upper chamber where debris is moved through the debris outlet, and nuts fall through said straw-walker and into said lower chamber where the nuts proceed through the outlet in the lower chamber.

4. A harvesting machine for picking up nuts and debris laying on the ground comprising:

a vehicle adapted to move along the ground in a forward direction; a pick-up means having an inlet and an outlet for causing nuts and debris laying on the ground to travel into the inlet and out of the outlet, means adjustably mounting said pick-up means to said vehicle;

said pick-up means includes a floating head assembly, said inlet to said pick-up means being disposed in underlying relationship with respect to said head, means for moving said inlet of said head vertically with respect to the vehicle so that the last named inlet can be positioned closely adjacent to the ground;

a pair of spaced apart sweepers; one said sweeper is circular in cross-section and has vanes radially disposed thereabout and parallel to the central longitudinal axis thereof;

another of said sweepers having tubular resilient members disposed radially thereabout with the free depending marginal ends of the members being received between adjacent vanes when the sweepers are rotating;

means by which said sweepers are journaled within said head; means for imparting rotational motion into each sweeper, with one sweeper rotating in an opposite direction relative to the other sweeper, so that when the sweepers are in close proximity to the ground, nuts and debris are forced into the inlet, through the head, and out of the outlet;

means for separating the nuts from the debris including a housing, a straw-walker, means mounting said straw-walker in said housing so that said straw-walker reciprocates longitudinally of its length and at the same time divides the housing into an upper and lower chamber; means forming openings in said straw-walker through which nuts can pass from the upper to the lower chamber;

a debris outlet in the upper chamber through which debris can pass;

a blower means connected to said lower chamber for blowing air through said straw-walker and through said debris outlet; whereby:

nuts fall from said upper chamber onto and through said straw-walker and into said lower chamber while debris is forced through said debris outlet.

5. The apparatus of claim 4 wherein said pick-up means includes a floating chamber pivotally connected to the vehicle so that said inlet can be moved into contact with the ground; said chamber having a laterally disposed nose affixed to opposed side walls and cooperating with an upper wall of the chamber to form said outlet;

said straw-walker having a forward end portion journaled to said separator and laying closely adjacent to said nose, and seal means connected between the straw-walker and the nose for preventing the flow of air between the separator and the pick-up means.

6. The apparatus of claim 4 wherein said straw-walker includes means by which it is journaled at opposed ends, and further includes a push rod by which it is reciprocated so that an intermediate portion of the rod describes an elliptical orbit;

a curved resilient member having a free end portion thereof slidably received by an upper surface of the lower wall of the lower chamber, the opposed end portion of said member being affixed to said push rod;

and a baffle attached to said push rod adapted to contact the lower wall surface as the rod reciprocates; whereby:

nuts are moved along the lower wall surface by the action of the resilient member and the baffle.

7. A harvesting machine for picking up nuts and debris laying on the ground comprising:

a vehicle adapted to move along the ground in a forward direction; a pick-up means having an inlet and an outlet for causing nuts and debris laying on the ground to travel into the inlet and out of the outlet, means adjustably mounting said pick-up means to said vehicle;

said pick-up means includes a head in the form of a housing, a pair of spaced apart sweepers, one said sweeper is circular in cross-section and has vanes radially disposed thereabout and parallel to the central longitudinal axis thereof;

another of said sweepers having tubular resilient members disposed radially thereabout with the free depending marginal ends of the members being received between adjacent vanes when the sweepers are rotating;

means by which said sweepers are journaled within said head; means for imparting rotational motion into each sweeper, with one sweeper rotating in an opposite direction relative to the other sweeper, so that when the sweepers are in close proximity to the ground, nuts and debris are forced into the inlet, through the head, and out of the outlet;

means for separating the nuts from the debris including a housing, a straw-walker, means mounting said straw-walker in said housing so that said straw-walker reciprocates longitudinally of its length and at the same time divides the housing into an upper and lower chamber; means forming openings in said straw-walker through which nuts can pass from the upper to the lower chamber;

a debris outlet in the upper chamber through which debris can pass;

a blower means connected to said lower chamber for blowing air through said straw-walker and through said debris outlet; whereby:

nuts fall from said first chamber onto and through said straw-walker and into said lower chamber while debris is forced through said debris outlet.

* * * * *